United States Patent
Chun

(10) Patent No.: US 9,711,061 B2
(45) Date of Patent: Jul. 18, 2017

(54) MULTI-PURPOSE EXERCISE APPARATUS FOR IMPROVING SPORTS COORDINATION

(71) Applicant: Yeong Seop Cheon, Seoul (KR)

(72) Inventor: Youngsub Chun, Seoul (KR)

(73) Assignee: Youngsub Chun, Seoul (KR)

( * ) Notice: Subject to any disclaimer, the term of this patent is extended or adjusted under 35 U.S.C. 154(b) by 0 days.

(21) Appl. No.: 14/941,619

(22) Filed: Nov. 15, 2015

(65) Prior Publication Data

US 2017/0069224 A1    Mar. 9, 2017

(30) Foreign Application Priority Data

Sep. 8, 2015 (KR) .................. 10-2015-0126959

(51) Int. Cl.
- *A63B 69/00* (2006.01)
- *G09B 19/00* (2006.01)
- *A63B 69/38* (2006.01)

(52) U.S. Cl.
CPC .......... *G09B 19/0038* (2013.01); *A63B 69/00* (2013.01); *A63B 69/0095* (2013.01); *A63B 69/0097* (2013.01); *A63B 69/38* (2013.01)

(58) Field of Classification Search
CPC ... A63B 67/04; A63B 69/0097; A63B 67/002; A63B 69/0002; A63B 69/38; A63B 69/00; A63B 69/0095; G09B 19/0038
USPC ............... 473/490–496, 476, 474, 415, 422; 273/317.4, 118 R, 119 R
See application file for complete search history.

(56) References Cited

U.S. PATENT DOCUMENTS

| | | | | |
|---|---|---|---|---|
| 1,163,102 A | * | 12/1915 | Morgan | A63F 7/0017 273/119 R |
| 2,066,159 A | * | 12/1936 | Post | A63B 67/04 473/474 |
| 2,111,339 A | * | 3/1938 | Squires | A63F 7/0652 473/475 |
| 2,174,884 A | * | 10/1939 | Kachel | A63B 67/04 473/434 |
| 2,313,701 A | * | 3/1943 | White | A63B 67/04 473/475 |
| 2,911,217 A | * | 11/1959 | Block | A47B 25/003 473/435 |
| 3,622,156 A | * | 11/1971 | Pugsley | A63B 67/04 473/496 |
| 3,777,674 A | * | 12/1973 | Parsons | A47B 3/083 473/496 |

(Continued)

FOREIGN PATENT DOCUMENTS

| | | | |
|---|---|---|---|
| CN | 201911586 U | * | 8/2011 |
| ES | 1078875 U | * | 3/2013 |

(Continued)

*Primary Examiner* — Mitra Aryanpour

(57) ABSTRACT

Provided herein is a multi-purpose exercise apparatus for improving sports coordination with which a user may sense stimuli from inside and outside one's body and at the same time operate one's body functions so as to adapt to the given circumstances using body muscles when playing a football, volleyball, handball, tennis, table tennis game and the like, thereby improving abilities of adjusting one's body parts such as the user's correct posture, balance, timing, flexibility, agility and the like, especially, significantly improving the ball control technique, body senses, and judgment ability of ball game players or sports participants.

11 Claims, 16 Drawing Sheets

(56) References Cited

U.S. PATENT DOCUMENTS

| | | | | |
|---|---|---|---|---|
| 3,992,006 A * | 11/1976 | Barlow | A63B 65/12 | 273/317.4 |
| 4,039,187 A * | 8/1977 | Shea | A63B 67/04 | 473/415 |
| 4,136,871 A * | 1/1979 | Meyers | A63F 7/0684 | 273/108.53 |
| 4,146,227 A * | 3/1979 | Kuna | A63B 65/12 | 273/119 R |
| 4,765,619 A * | 8/1988 | Cooper | A47B 25/003 | 473/496 |
| 5,398,926 A * | 3/1995 | Skinner | A63B 67/04 | 473/475 |
| 5,460,365 A * | 10/1995 | Payne | A63B 67/04 | 473/494 |
| 6,379,273 B1 * | 4/2002 | Takacs | A63B 67/04 | 473/473 |
| 6,645,096 B1 * | 11/2003 | Nally | A47B 37/04 | 473/496 |
| 7,841,958 B2 * | 11/2010 | Fleming | A63B 67/04 | 473/496 |
| 8,062,153 B2 * | 11/2011 | Boseman | A63B 67/04 | 473/475 |
| 2004/0079261 A1 * | 4/2004 | Nally | A63B 67/04 | 473/496 |
| 2004/0266568 A1 * | 12/2004 | Dadbeh | A63B 67/04 | 473/496 |
| 2005/0001392 A1 * | 1/2005 | Walter | A63B 69/0093 | 280/14.21 |
| 2009/0191987 A1 * | 7/2009 | Fleming | A63B 67/04 | 473/475 |
| 2013/0217521 A1 * | 8/2013 | Santini | A47B 25/003 | 473/475 |

FOREIGN PATENT DOCUMENTS

| | | | |
|---|---|---|---|
| FR | 2845923 A1 * | 4/2004 | A63B 67/04 |
| KR | 1991-0001619 | 3/1991 | |
| KR | 10-0818784 | 4/2008 | |
| KR | 10-1135804 | 4/2012 | |
| KR | 20-2015-0002805 | 7/2015 | |

* cited by examiner

MULTI-PURPOSE EXERCISE APPARATUS FOR IMPROVING SPORTS COORDINATION

RELATED APPLICATION

This application claims the benefit of priority of Korean Patent Application No. 10-2015-0126959 filed Sep. 8, 2015, the contents of which are incorporated herein by reference in their entirety.

FIELD AND BACKGROUND OF THE INVENTION

1. Field

The following description relates to a multi-purpose exercise apparatus for improving sports coordination, and more particularly, to a new type of multi-purpose exercise apparatus for exercising sports coordination with which a user may sense stimuli from inside and outside one's body and at the same time operate one's body functions so as to adapt to the given circumstances using body muscles when playing a football, volleyball, handball, tennis, table tennis game and the like, thereby improving abilities of adjusting one's body parts such as the user's correct posture, balance, timing, flexibility, agility and the like.

2. Description of Related Art

Generally, it is the fundamental of all exercises and sports to expect at least a certain exercising effect from all the organs of movement of a human body making harmonious movements while maintaining adjustable relationships between one another.

In science terms, 'Coordination' refers to the harmonious interaction between sensory organs, end organs and central nervous systems, and skeletal muscle organs. Thus, a sports coordination exercise consisting of continuous movements aims at enabling the muscles suitable to the right timing and circumstances to act on one another.

Sports coordination refers to a body adjusting ability of enabling the exact amount of muscles necessary for making movements in the right timing to function consciously or unconsciously in the method desired or wanted by the sports participant. That is, sports coordination is the ability to support all parts of the body muscles to move simultaneously at the right timing.

Therefore, coordination exercise includes using various body systems and motion types that form individual actions and technique necessary for performing a certain movement.

Coordination exercise is a core function that people and athletes intending to enjoy various sports and exercises need, and an exact coordination exercise provides a synergy effect by way of effective movements and the brain for efficient utilization of muscles.

Especially, sports coordination exercise is most needed in sports games where players use a ball, and the exercise for improving body adjustment abilities is an exercise most needed for children and teenagers or sports participants who use balls.

In a sports game using a ball, one's body ability to efficiently move all parts of his/her body including arms, legs, pelvis, waist and shoulders according to the commands sent from the brain based on sensory judgment of the person makes the person move one step faster than others.

Furthermore, since coordination exercise helps all body muscles and nervous systems to be prepared for the main exercise, not only does it significantly improves the ability to acquire the exercise but it may also be used as a preliminary exercising process to prevent various types of injuries from occurring during an extreme exercise (neuro-muscle exercise).

For example, when playing football, players have to move constantly, and when a player is approached by a ball, the transition to the right posture to control the ball perfectly must be made in a very short period of time.

The player will have to lower centroid of his/her body, decide which body part to use and in which direction to move, and make a weight-shift by stepping up. Furthermore, if there is a defender, the player has to use the arms, back and shoulders in addition. Therefore, a bunch of movements must be made in a very short moment. It is the sports coordination exercise that makes these preparations more precise and faster.

Traditional coordination exercises use various types of exercising equipments (large ball, cone, bar, exercising ladder), but these exercises require the players to repeat the same movements over and over again, making the players get bored and find it hard to keep concentrated on and maintain interest in the game.

Especially, monotonous coordination exercises for adults with degenerating sports abilities being provided when their flexibility, sense of balance and agility are deteriorating is less effective and thus does not develop into continuous exercises.

Furthermore, strengthening muscles using fitness equipments or doing aerobic exercises by simply running may exacerbate imbalance of the participant body, and impede a harmonious development of all parts of the body.

Besides, many athletes and sports participants want to maintain their body balance and shape using all parts of their body effectively, but there has been no proposed apparatus or equipment proposed that could help people exercise their all body parts evenly while improving their body adjustment abilities.

NON-PATENT DOCUMENTS

1. K. Meinel/G. Schnabel: Kinesiology—Sport motor, Munich (West) 2007, Seven Coordination Components for Football
1) Balance ability, 2) Orientation ability, 3) Differentiation ability, 4) Reaction ability, 5) Rhythmic ability, 6) Ability to adapt & adjust, 7) Interoperability.
2. Bruce Lee, Tao of Jeet Kune Do, 2001, Coordination Theory and Exercise for Athletes (Martial Artists).

All documents cited in the present disclosure, including published documents, patent applications, and patents, may be incorporated herein in their entirety by reference in the same manner as when each cited document is separately and specifically incorporated or incorporated in its entirety.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A purpose of the present disclosure is to resolve the aforementioned problems of the conventional technique, that is, to provide a multi-purpose exercise apparatus for improving sports coordination that allows athletes or sports participants to improve coordination and sports coordination, which is the body adjustment ability, in a most effective and efficient way.

Another purpose of the present disclosure is to provide a multi-purpose exercise apparatus for improving sports coordination that allows a user to maximize his/her physical ability based on increased excitement and competitive spirit, and that allows each body function of the user to operate smoothly so as to maintain a healthy body.

Another purpose of the present disclosure is to provide a multi-purpose exercise apparatus for improving sports coordination that allows a user to improve his/her ball control ability, various touching ability, shooting ability and judgment ability that are most important factors in football, futsal, foot volleyball, and Sepak Takraw widely played by many people, thereby providing the user to easily acquire advanced football techniques by playing those games.

Another purpose of the present disclosure is to provide a multi-purpose exercise apparatus for improving sports coordination, the apparatus provided with playing planes of which the angles are adjustable such that the level of difficulty may be adjusted and of which the surfaces are inconsistent such that the plane that a bouncing ball contacts is inconsistent over the curved surface of the playing planes, allowing the speed and direction of the ball to vary randomly, and therefore helping a user to improve his/her body adjustment ability by requiring extreme concentration from the user in using his/her sensitive perception and physical senses in order to move all body parts to arrive at an exact portion of a ball and to control the ball.

Another purpose of the present disclosure is to provide a multi-purpose exercise apparatus for improving sports coordination, the apparatus provided with playing planes of which the heights are adjustable so that the level of difficulty may be raised, requiring a user to maintain the balance and rhythm of the body if he/she is to keep a ball in a desired state, and to elaborately adjust the muscles of the entirety of body parts if he/she is to pass the ball to a team member or counterpart, thereby enabling the user to improve his/her physical balance, agility, flexibility, and perception ability.

Another purpose of the present disclosure is to provide a multi-purpose exercise apparatus for improving sports coordination, the apparatus provided with playing planes that may be rotated to stand up in a vertical direction so that the apparatus may be easily put away when not being used.

Another purpose of the present disclosure is to provide a multi-purpose exercise apparatus for improving sports coordination, the apparatus provided with playing planes having wheels so that the apparatus may be easily moved and arranged in any place.

Another purpose of the present disclosure is to provide a multi-purpose exercise apparatus for improving sports coordination, the apparatus provided with playing planes having a locking unit for fixating wheels of a support unit that supports the planes so as to prevent the planes from moving during a game.

Another purpose of the present disclosure is to provide a multi-purpose exercise apparatus for improving sports coordination, the apparatus provided with a net unit that is installed in the middle of two playing planes and of which the height is adjustable such that the level of difficulty may be adjusted.

According to an aspect, there is provided a multi-purpose exercise apparatus for improving sports coordination, the apparatus including a first playing plane and second playing plane each configured to have the shape of a panel and to meet each other at one side thereof, a central portion of the area where the playing planes meet each other formed as a curved surface upwardly convexed and downwardly inclined in an outer direction of a longitudinal direction and width direction; and a first support and second support each disposed below and coupled to the first playing plane and second playing plane, respectively, such that the playing planes are rotatable.

Herein, the angle between the height of an uppermost step and a lowermost step in the longitudinal direction of each playing plane may be over 0° and less than 15°, and the angle between the height of an uppermost step and a lowermost step in the width direction of each playing plane may be above 0 degrees and below 10 degrees.

A longitudinal end of each playing plane may be formed to have an offset curvature.

Each support may include a playing plane frame coupled along an edge of each playing plane, and a fixing frame coupled to the playing plane frame to support the playing plane frame from below.

The playing plane frame may include a first frame coupled to each playing plane, and a second frame coupled below the first frame, and a playing plane angle adjustment unit may be disposed between the first frame and second frame, the first frame installed such that it is rotatable around the second frame.

The playing plane angle adjustment unit may include a rotation frame of which one side is coupled and fixed to the first frame and the other side coupled to the second frame such that it is rotatable; a rotation groove formed on the rotation frame; and a fixing pin installed on the first frame to move along the rotation groove, wherein the angle of the first frame is adjusted as the fixing pin moves along the rotation groove.

The rotation frame may be further provided with a storing hole where the fixing pin is inserted and fixed in response to the playing planes being arranged in a vertical direction.

A movable wheel may be installed in the fixing frame.

A locking unit configured to prevent the wheel from rotating may be to installed in the fixing frame.

The locking unit may include a locking lever configured to penetrate along the center of a rotation axis of the wheel from outside and to be screw-coupled to the fixing frame; a first locking member configured to rotate in an interlocked manner with the locking lever to move along an inner/outer direction of is the wheel; and a second locking member installed on the fixing frame and geared to the first locking member to prevent the wheel from rotating.

The apparatus may further include a height adjustment unit disposed between the playing plane frame and fixing frame, and configured to enable adjustment of the height of the playing planes.

The height adjustment unit may include a handle installed on the fixing frame such that it is rotatable, and coupled such that it may be withdrawn and inserted in an inner/outer direction; a first gear coupled in an inner direction of the handle, and configured to rotate in an interlocked manner with the handle; and a second gear coupled to the playing plane frame and geared to the first gear such that it is movable in an up/down direction as the first gear rotates.

The apparatus may further include a net unit installed between the first playing plane and second playing plane.

According to the aforementioned various embodiments of the present disclosure, there is provided a multi-purpose exercise apparatus for improving sports coordination that allows athletes or sports participants to improve coordination and sports coordination, which is the body adjustment ability, in a most effective and efficient way.

Furthermore, there is provided a multi-purpose exercise apparatus for improving sports coordination that allows a user to maximize his/her physical ability based on increased interest and competitive spirit, and that allows each body function of the user to operate smoothly so as to maintain a healthy body.

Furthermore, there is provided a multi-purpose exercise apparatus for improving sports coordination that allows a user to improve his/her ball control ability, various touching ability, shooting ability and judgments that are most is important factors in football, futsal, foot volleyball, and Sepak Takraw widely played by many people, thereby providing the user with the freedom to easily acquire advanced football techniques by playing those games.

Furthermore, there is provided a multi-purpose exercise apparatus for improving sports coordination, the apparatus provided with playing planes of which the angles are adjustable such that the level of difficulty may be adjusted and of which the surfaces are inconsistent such that the plane that a bouncing ball contacts is inconsistent over the curved surface of the playing planes, allowing the speed and direction of the ball to vary randomly, and therefore helping a user to improve his/her body adjustment ability by requiring extreme concentration from the user in using his/her sensitive perception and physical senses in order to move all body parts to arrive at an exact portion of a ball and to control the ball.

Furthermore, there is provided a multi-purpose exercise apparatus for improving sports coordination, the apparatus provided with playing planes of which the heights are adjustable so that the level of difficulty may be raised, requiring a user to maintain the balance and rhythm of the body if he/she is to keep a ball in a desired state, and to elaborately adjust the muscles of the entirety of body parts if he/she is to pass the ball to a team member or counterpart, thereby enabling the user to improve his/her physical balance, agility, flexibility, and perception ability.

Furthermore, there is provided a multi-purpose exercise apparatus for improving sports coordination, the apparatus provided with playing planes that may be rotated to stand up in a vertical direction so that the apparatus may be easily put away when not being used.

Furthermore, there is provided a multi-purpose exercise apparatus for improving sports coordination, the apparatus provided with playing planes having is wheels so that the apparatus may be easily moved and arranged in any place.

Furthermore, there is provided a multi-purpose exercise apparatus for improving sports coordination, the apparatus provided with playing planes having a locking unit for fixating wheels of a support unit that supports the planes so as to prevent the planes from moving during a game.

Furthermore, there is provided a multi-purpose exercise apparatus for improving sports coordination, the apparatus provided with a net unit that is installed in the middle of two playing planes and of which the height is adjustable such that the level of difficulty may be adjusted.

Other features and aspects will be apparent from the following detailed description, the drawings, and the claims.

DESCRIPTION OF SPECIFIC EMBODIMENTS OF THE INVENTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a is certain order. Also, descriptions of functions and constructions that are well known to one of ordinary skill in the art may be omitted for increased clarity and conciseness The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In describing various embodiments of the present disclosure, components having the same configurations as those in other embodiments will be explained once with reference to the first embodiment representatively, and only the components that are different from the first embodiment will be described with reference to other embodiments.

Hereinafter, a multi-purpose exercise apparatus for improving sports coordination according to a first embodiment of the present disclosure will be explained with reference to the drawings attached.

Figure 1:
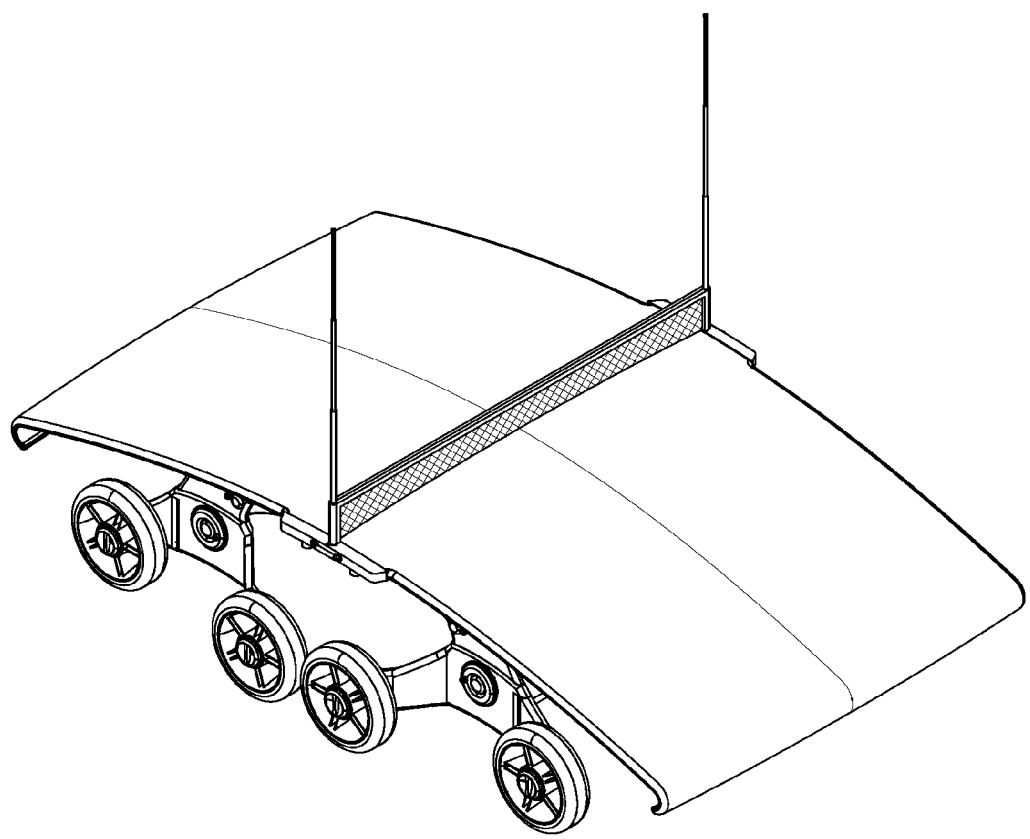
FIG. 1 is a perspective view of a multi-purpose exercise apparatus for improving sports coordination according to a first embodiment of the present disclosure.
Figure 2:
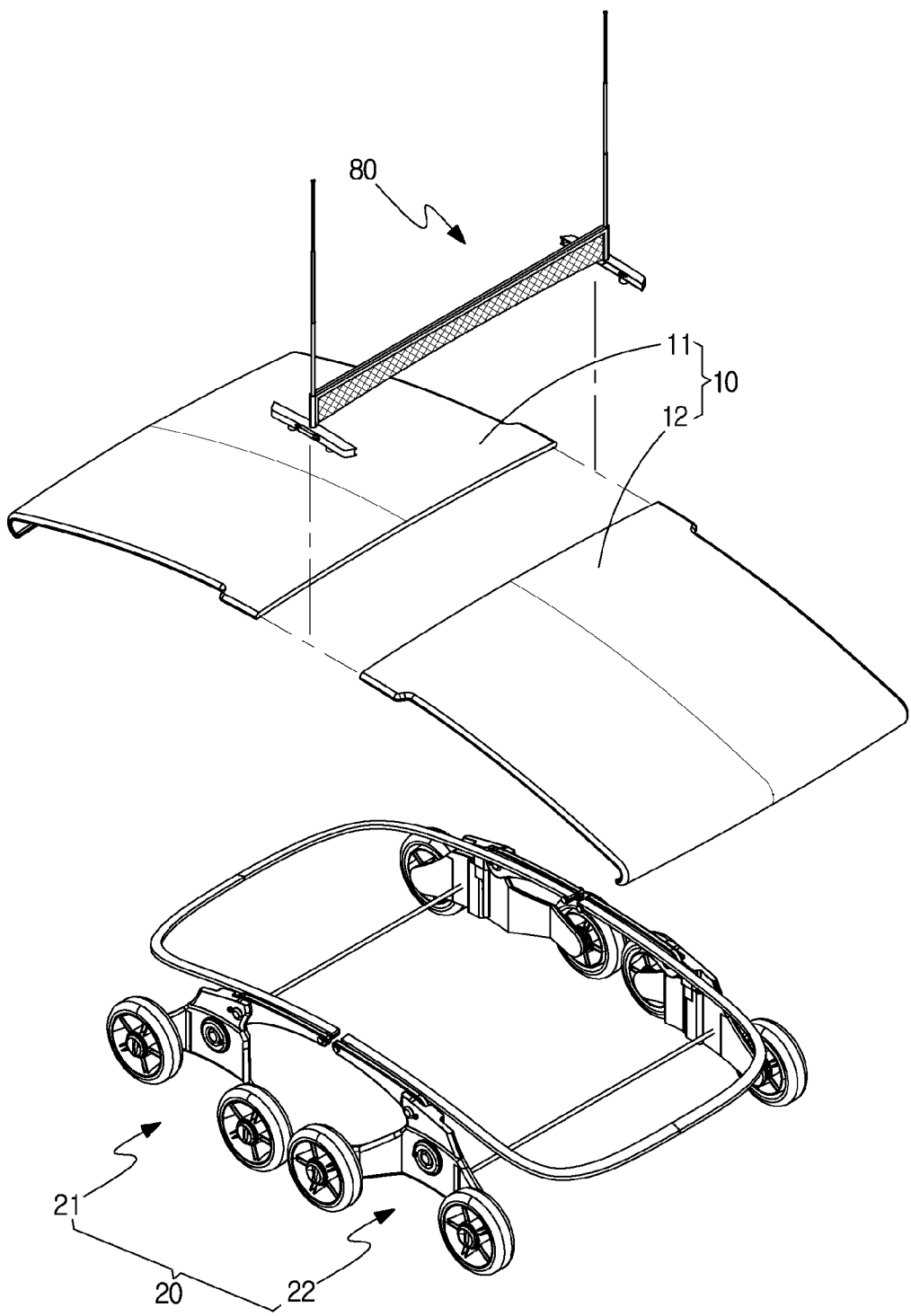
FIG. 2 is an exploded view of one portion of FIG. 1.

FIG. 1 is a perspective view of a multi-purpose exercise apparatus for improving sports coordination according to the first embodiment of the present disclosure, and FIG. 2 is an exploded view of one portion of FIG. 1.

Referring to FIG. 1 and FIG. 2, the multi-purpose exercise apparatus for improving sports coordination 1 according to the first embodiment of the present disclosure includes a playing plane 10, support unit 20 and net unit 80.

The playing plane 10 includes a first playing plane 11 and second playing plane 12 that are disposed to meet each other with the net unit 80 arranged therebetween, and the support unit 20 includes a first support 21 and second support 22 disposed below the first playing plane 11 and second playing plane 12, is respectively.

The playing planes 11, 12, while contacting each other, may be mutually coupled to each other at a lower portion thereof or where the playing planes 11, 12 meet each other by a predetermined coupling means, and then fixated as such.

The playing planes 11, 12 have the same configurations, and so do the supports 20, 21, and thus only the first playing plane 11 and first support 21 will be explained, representatively.

Figure 3:
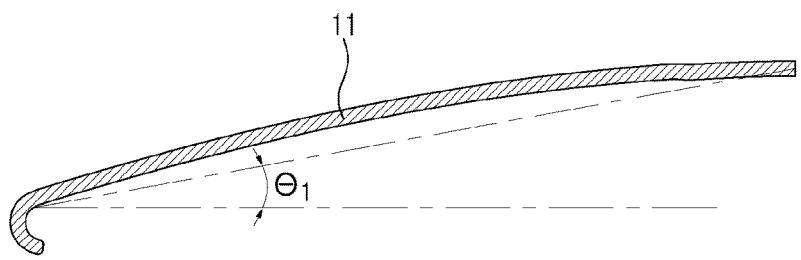
FIG. 3 is a longitudinal cross-sectional view of a first playing plane of FIG. 2.
Figure 4:
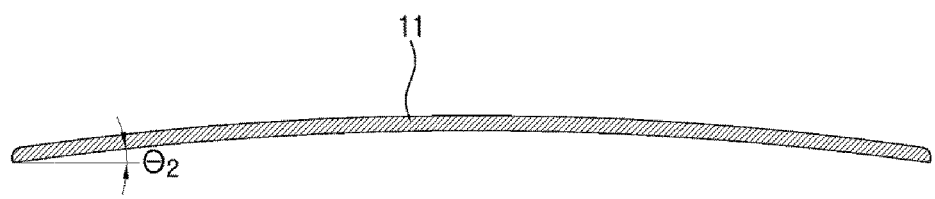
FIG. 4 is a width direction cross-sectional view of the first playing plane of FIG. 2.

FIG. 3 is a longitudinal cross-sectional view of a first playing plane of FIG. 2, and FIG. 4 is a width direction cross-sectional view of the first playing plane of FIG. 2.

Referring to FIG. 3 and FIG. 4, the first playing plane 11 is configured as a roughly square shaped panel, and a central portion of the area where the playing planes meet each other is formed as curved surface upwardly convexed and downwardly inclined in an outer direction of a longitudinal direction and width direction.

Herein, the first playing plane 11 is formed to have a width (W) of about 180 cm (70.87 inches) and a length (L) of about 160 cm (62.99 inches), and the angle ($\theta_1$) between the height of an uppermost step and a lowermost step in the longitudinal direction of the first playing plane 11 being above 0 degrees and below 15 degrees, and the angle ($\theta_2$) between the height of an uppermost step and a lowermost step in the width direction of the first playing plane 11 being above 0 degrees and below 10 degrees.

Desirably, and the angle ($\theta_1$) between the height of an uppermost step and a lowermost step in the longitudinal direction of the first playing plane 11 is above 0° and below 10°, and the angle ($\theta_2$) height of an uppermost step and a lowermost step in the width direction of the first playing plane 11 is above 0° and is below 5°.

Furthermore, the outer end of the first playing plane 11 in the longitudinal direction including a downwardly curved offset surface is formed to be superposed with an outer end of the first playing plane 11 having a space in between, and a round-shaped chamfer is formed at a corner of an outer end in the width direction of the first playing plane 11.

Figure 5:
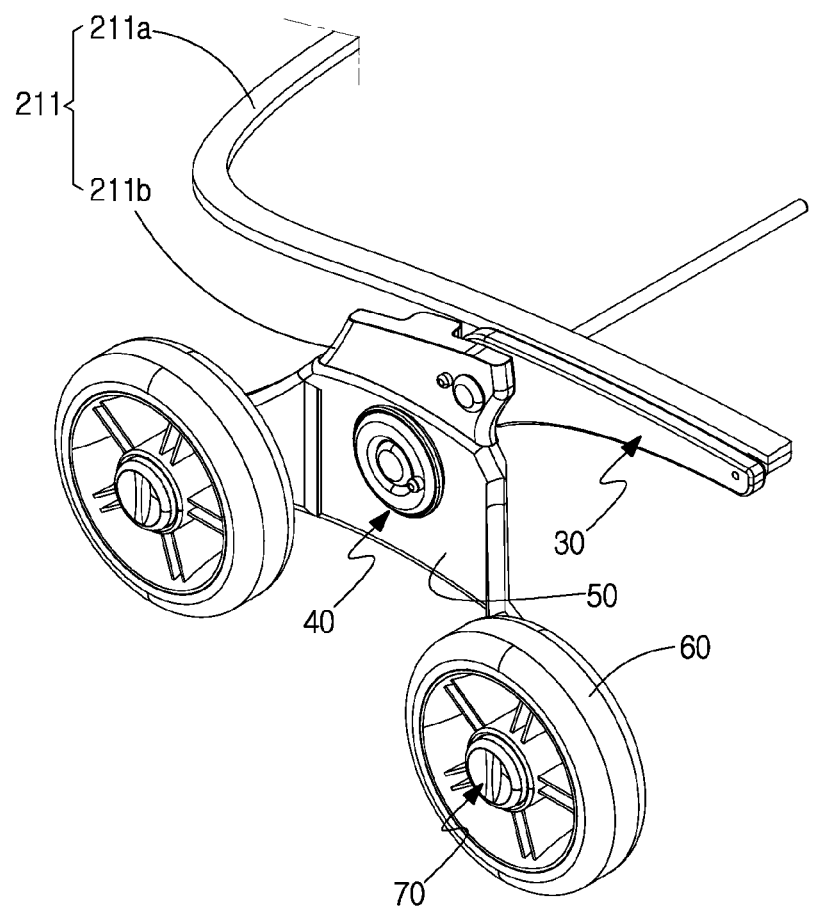
FIG. 5 is an enlarged view of a first support unit of FIG. 2.

FIG. 5 is an enlarged view of the first support of FIG. 2. Referring to FIG. 5, the first support 21 is coupled below the first playing plane 11 to support the first playing plane 11, the first support 21 including a playing plane frame 211 and playing plane angle adjustment unit 30, height adjustment unit 40 and fixing frame 50. The playing plane frame 211 includes a first frame 211a and second frame 211b.

The first frame 211a is formed along an edge of the first playing plane 11, and desirably, along at least three edges of the first playing plane so as to stably support the first playing plane 11.

The second frame 211b is coupled below the first playing plane 11 at both sides (that is, left and right) of the first playing plane 11. And a portion of a height adjustment unit that will be explained later on is coupled to the second frame 211b.

Figure 6:
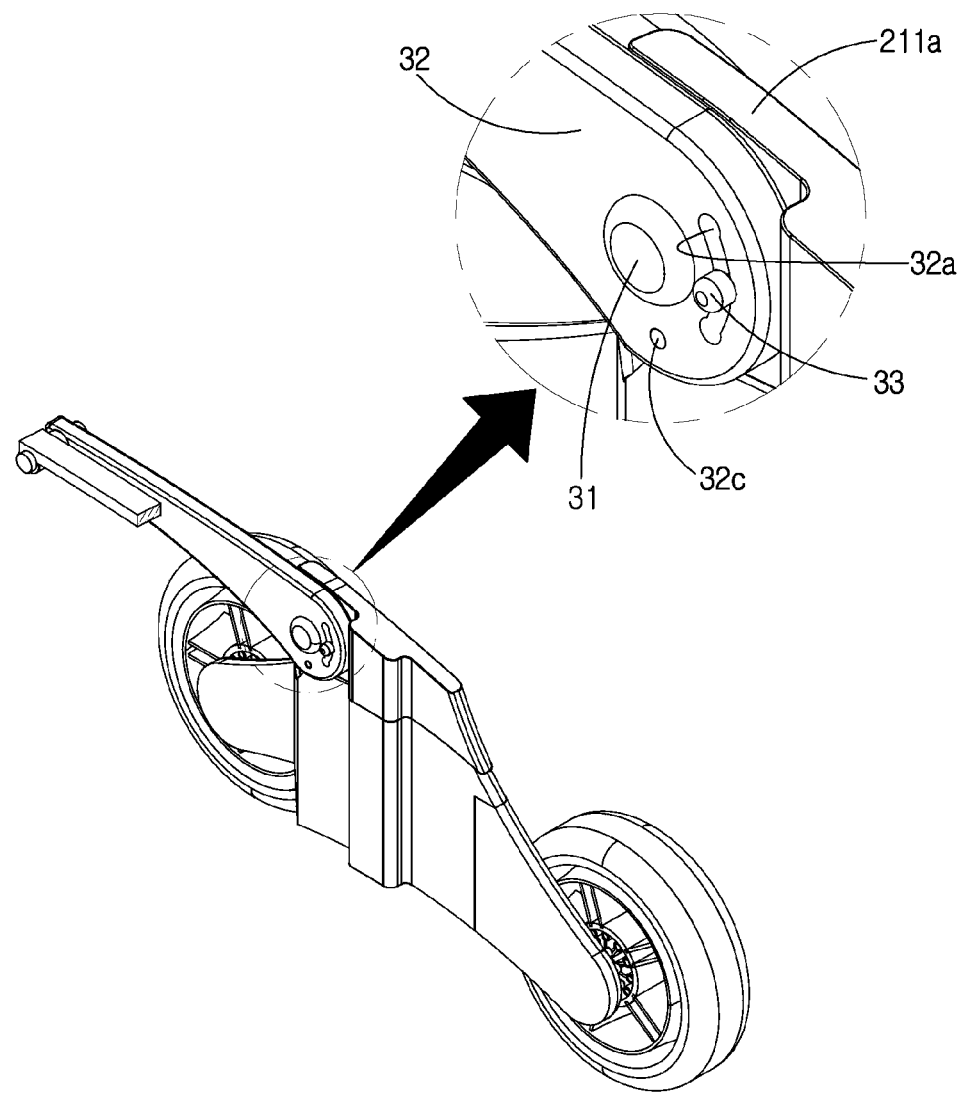
FIG. 6 is a view illustrating details of a playing plane angle control unit of FIG. 5.
Figure 7:
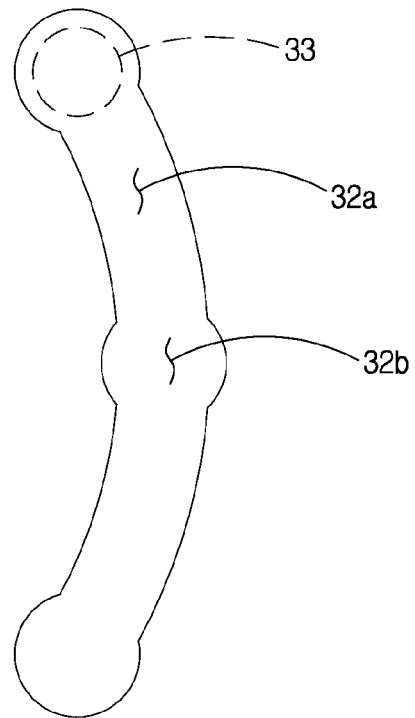
FIG. 7 is an enlarged view of a rotation groove of the playing plane angle control unit of FIG. 6.
Figure 8:
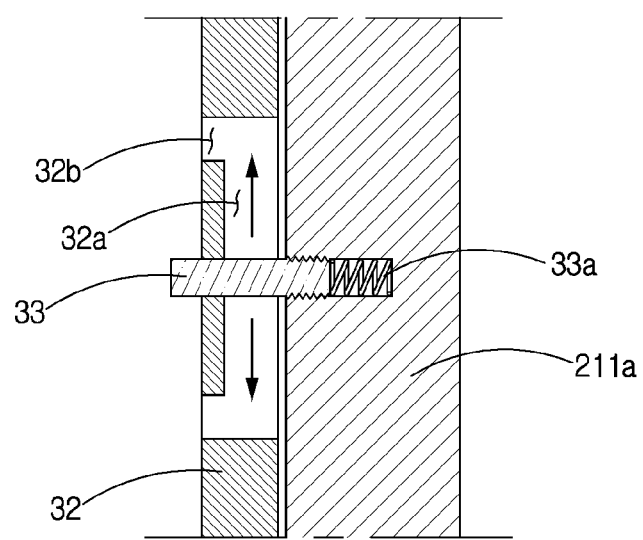
FIG. 8 is a cross-sectional view cut along the rotation groove.

FIG. 6 is a view illustrating details of a playing plane angle control unit of FIG. 5, FIG. 7 is an enlarged view of a rotation groove of the playing plane angle control unit of FIG. 6, and FIG. 8 is a cross-sectional view cut along the rotation groove.

Referring to FIGS. 6, 7 and 8, the playing plane angle adjustment unit 30 includes a rotation axis 31, rotation frame 32 and fixing pin 33.

One side of the rotation frame 32 is fixed to one side of the first frame 211a, and the other side of the rotation frame 32 is coupled to the second frame 211b through the rotation axis 31 such that the rotation frame 32 is rotatable around the rotation axis 31.

On the rotation frame 32, a rotation groove 32a having the shape of a circular arc of which the center is the rotation axis 31 is formed, and on the rotation groove 32a, three additional fixing grooves 32b are formed.

On the first frame 211a that faces the rotation groove 32a, a fixing pin 33 is installed along the rotation groove 32a in a movable manner, the fixing pin 33 also being installed such that it is movable in an outer/inner direction by an elastic member 33a such as a predetermined spring and the like.

Figure 9:
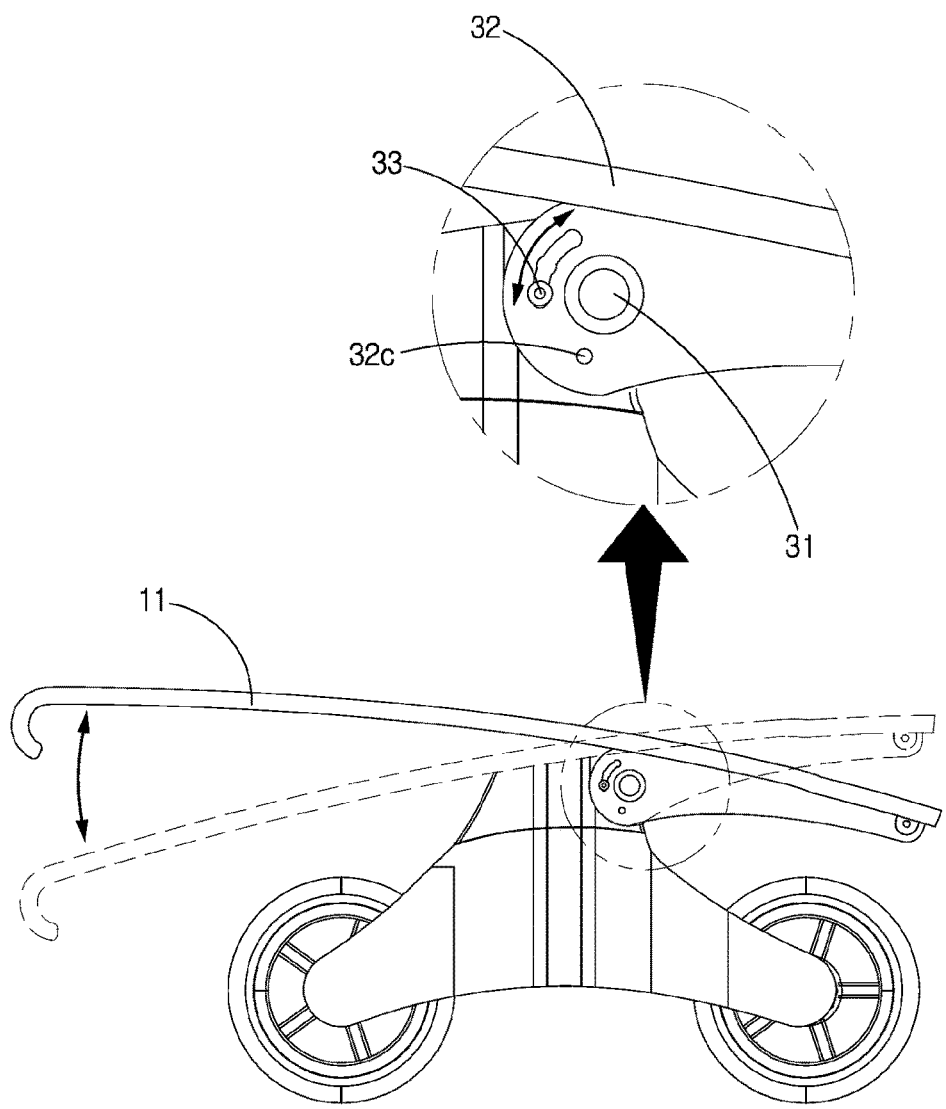
FIG. 9 is a functional state view of the playing plane angle control unit of FIG. 6.

That is, the fixing pin 33, when elastically compressed by the elastic member 33a and the like, may move along the rotation groove 32a, but upon meeting the fixing groove 32b, the fixing pin 33 may be moved in an outer direction by the elastic force, and thus not moving any further. In this way, the angle of the first playing plane 11 may be adjusted as illustrated in FIG. 9.

Meanwhile, the rotation frame 32 may be further provided with a storing hole 32c. The storing hole 32c may be formed in one of the rotation points of the aforementioned fixing pin 33 such that it may be penetrated and inserted by the fixing pin 33.

Figure 10:
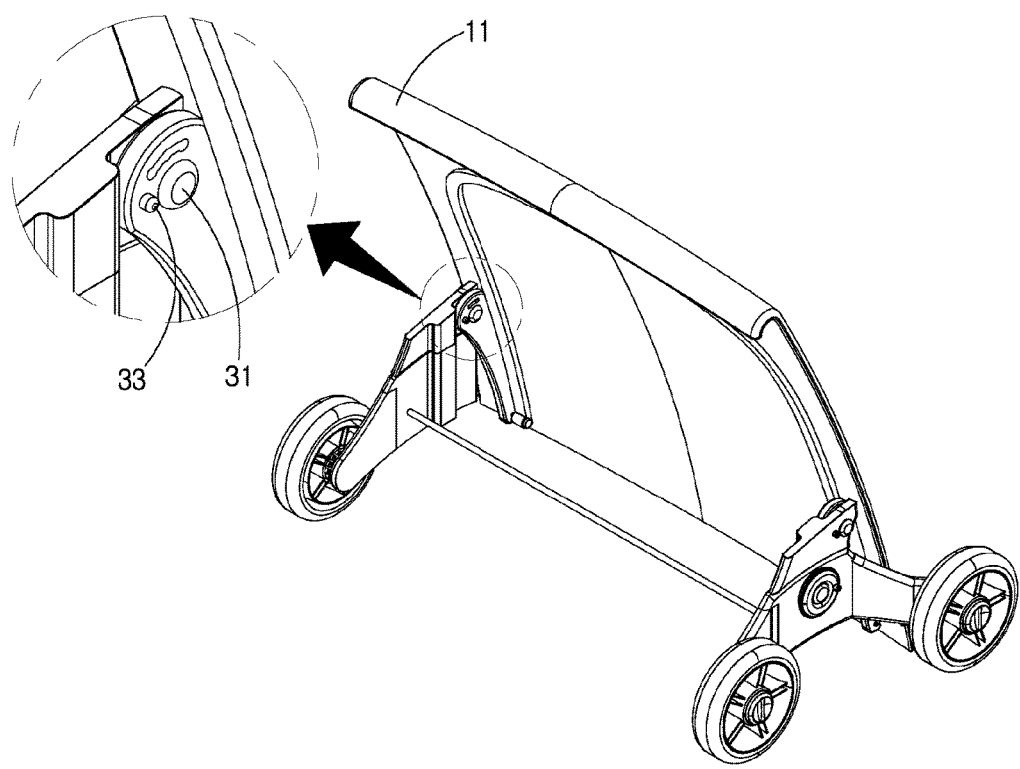
FIG. 10 is a view illustrating the multi-purpose exercise apparatus for improving sports coordination in a state to be kept away when not in use.

That is, when the multi-purpose exercise apparatus for improving sports coordination is not being used, as illustrated in FIG. 10, the fixing pin 33 may be inserted into the storing hole 32c and the apparatus may be rotated to make it stand up in a vertical direction to put it away for future use, or to secure space for other activities.

In this embodiment, it was explained by way of an example that an angle may be adjusted using the rotation groove 32a, fixing groove 32b and fixing pin 33, but there is no limitation thereto, that is, the apparatus may be configured such that an angle may be adjusted by other types of rotation structure and fixing structure similar to that explained above.

Figure 11:
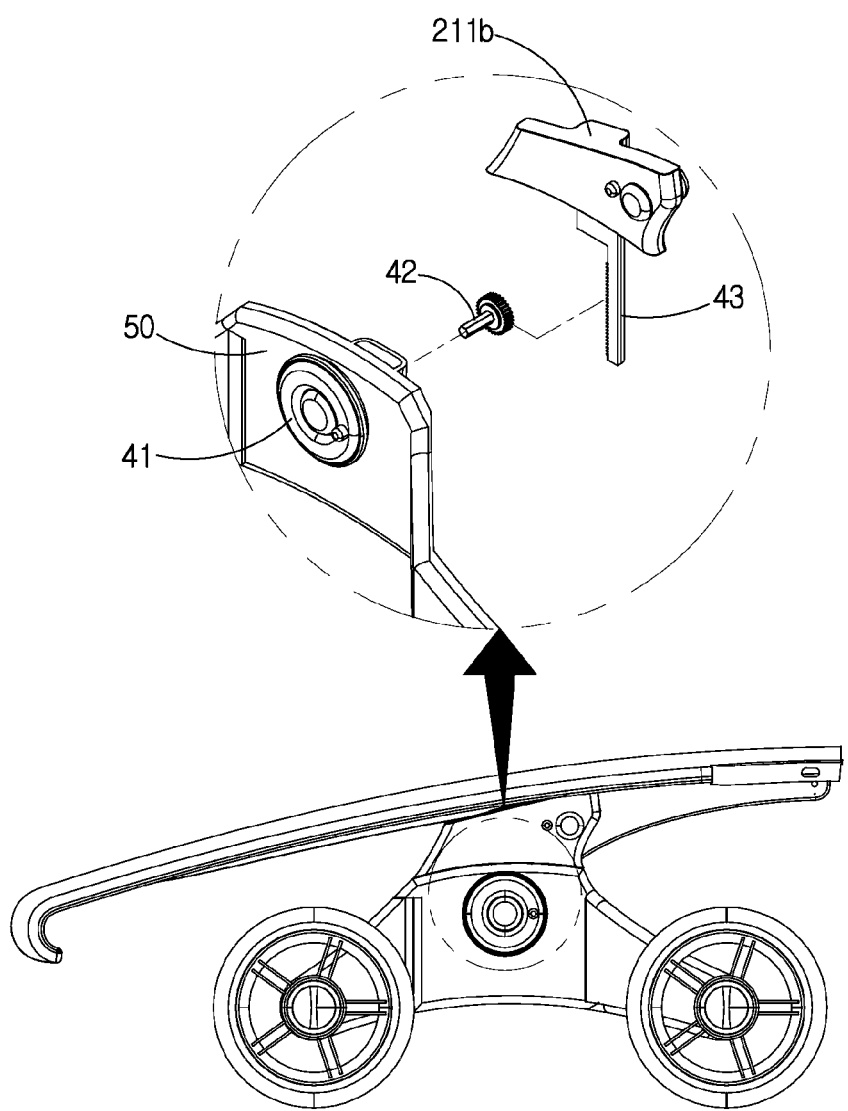
FIG. 11 is a view illustrating details of a height control unit of FIG. 5.
Figure 12:
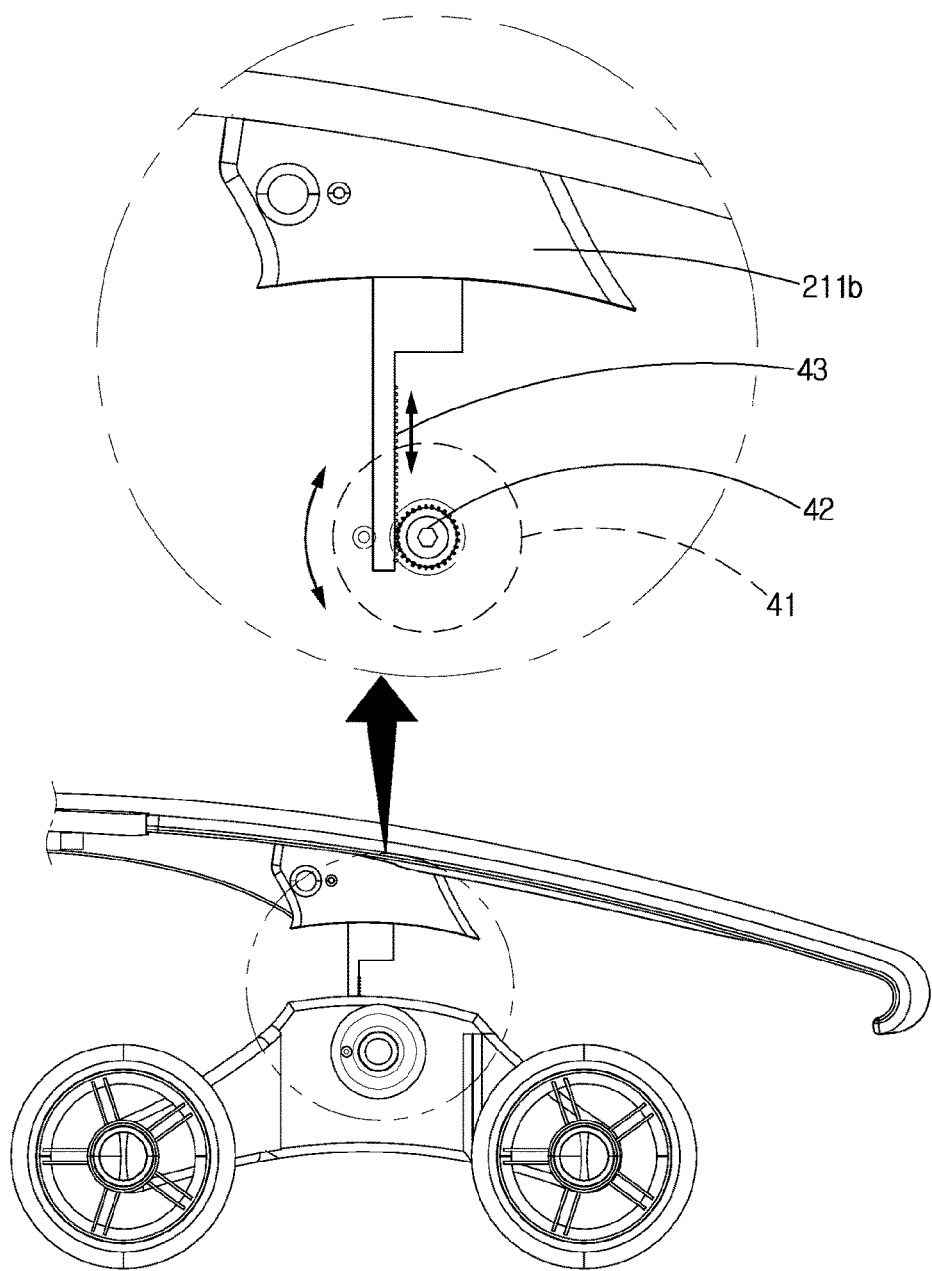
FIG. 12 is a view illustrating the height adjustment unit of FIG. 5 being adjusted.

FIG. 11 is a view illustrating details of a height control unit of FIG. 5, and FIG. 12 is a view illustrating the height adjustment unit of FIG. 11 being adjusted. Referring to FIG. 11, the height adjustment unit 40 includes a handle 41 coupled to the fixing frame 50, a first gear 42 configured to rotate in an interlocked manner with the handle 41, and a second gear 43 formed on the second frame 211b of the playing plane 211 such that is may be geared and coupled to the first gear 42.

The handle 41 is installed such that it may be withdrawn in an outer/inner direction so as to enable easy manipulation of the handle by the user. Furthermore, a stumbling block (not illustrated) may be formed on a predetermined area such that, in the case of withdrawing the handle 41 in an outer direction, the handle 41 may be stuck after some of it has been withdrawn in a thickness direction.

That is, in adjusting the height of the first playing plane 11, as illustrated in FIG. 12, first, the user withdraws the handle 41 in an outer direction and then rotates the handle 41 clockwise or counterclockwise, the second frame 211b becomes movable in an up/down direction, and then, when the user is finished moving the second frame 211*b*, the handle 41 may be inserted back in an inner direction and then fixed. Accordingly, it is possible to adjust the height of the first playing plane 11.

Figure 13:
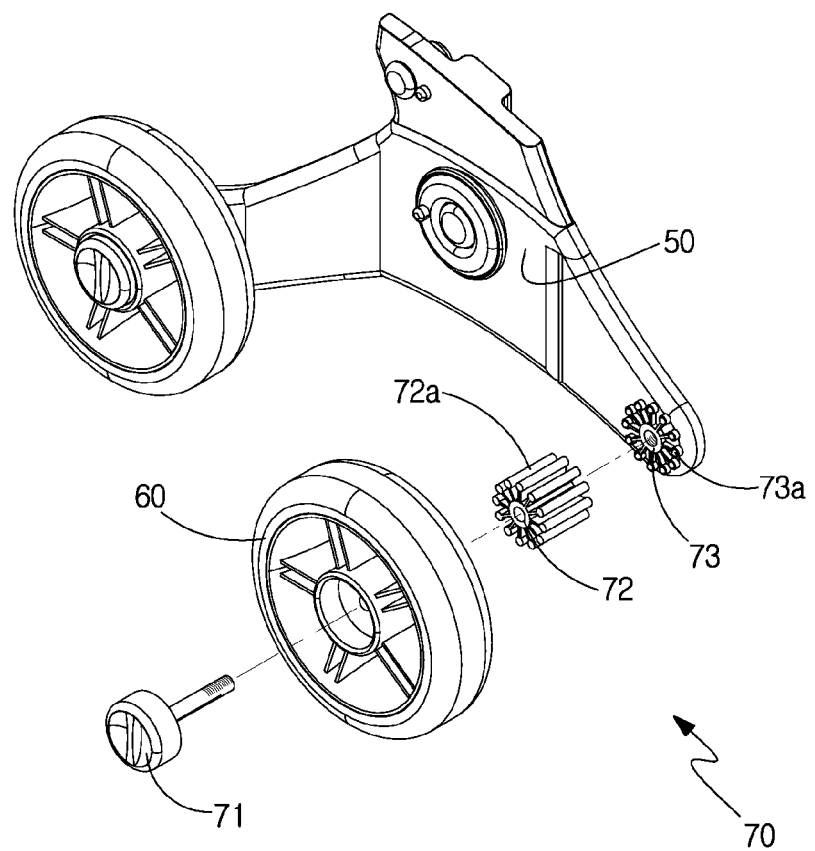
FIG. 13 is a view illustrating details of a fixing frame of FIG. 5.

FIG. 13 is detailed view of the fixing frame of FIG. 5. Referring to FIG. 13, the fixing frame 50 is installed such that it meets the aforementioned second frame 211*b* of the frame 211, and on the area that meets with the bottom surface, a wheels 60 are installed that is distanced along the longitudinal direction of the first playing plane 11. Each wheel 60 is coupled to the fixing frame 50 such that is rotatable around a wheel axis.

The wheel 60 is a tube type wheel that may be used both indoors and outdoors. Furthermore, it may be a type of wheel with sufficient height and size to move with ease even in playgrounds made of grass or rough soil.

Meanwhile, a locking unit 70 is further installed between each wheel 60 and fixing frame 50. The locking unit 70 includes a locking lever 71 configured to penetrate along the center of the rotation axis of the wheel and to be screw-coupled to the fixing frame 50 so as to move in an inner/outer direction of the wheel 60 during rotation, a first locking member 72 coupled to an exterior of the lever and configured to rotate in an interlocked manner with the locking lever 71 as the locking lever 71 rotates, and a second locking member 73 coupled to the fixing frame 50 and installed to be geared to the first locking member 72.

The second locking member 73 is provided with a protruding end 73*a*, and the first locking member 72 is provided with an insertion hole 72*a* where the protruding end 73*a* is inserted.

Figure 14:
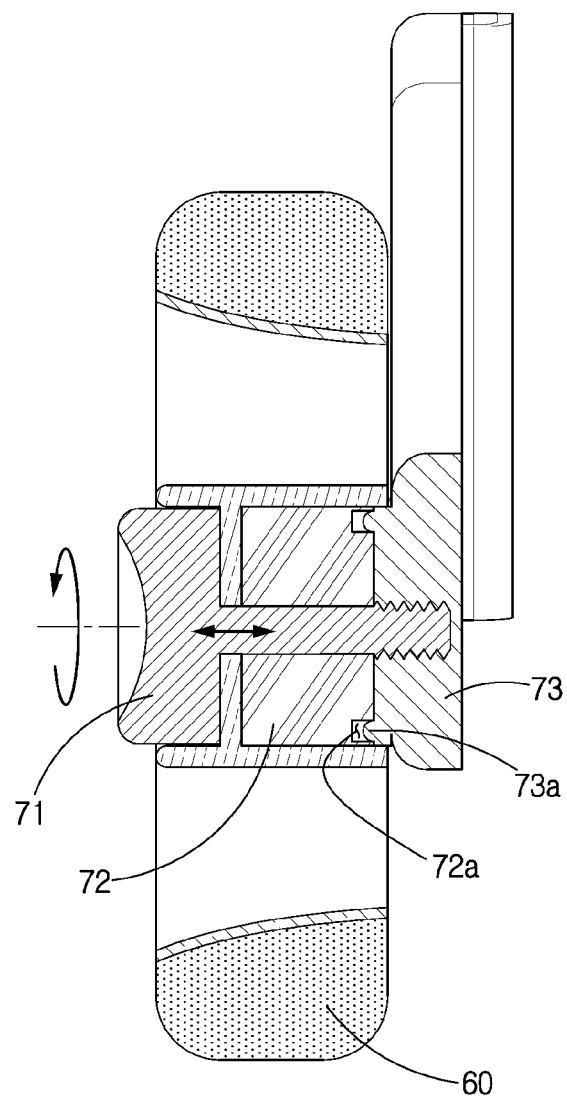
FIG. 14 is a functional state view of a locking unit of FIG. 13.

That is, as illustrated in FIG. 14, when the locking lever 71 is rotated clockwise so that it moves in an inner direction of the wheel 60, the protruding end 73*a* of the second locking member 73 is inserted into the insertion hole 72*a* of the first locking member 72, thereby fixing the wheel 60.

Likewise, when the locking lever 71 is rotated counter-clockwise, the locking of the wheel 60 may be released.

Figure 15:
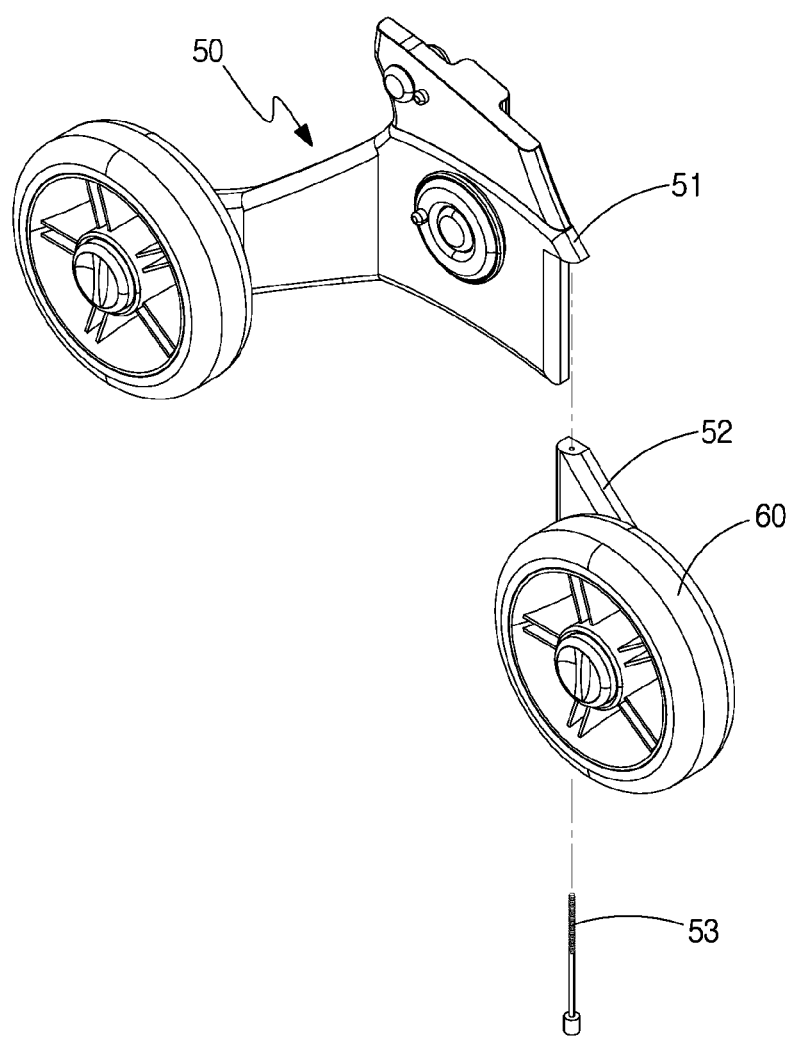
FIG. 15 is a view illustrating details of a portion of FIG. 13.

FIG. 15 is a view illustrating details of a portion of FIG. 13. Referring to FIG. 15, on the fixing frame 50, any one of the two wheels 60 distanced to secure ease of motion may be rotatable. That is, the fixing wheel 50 is separately formed to consist of two parts: a first part frame 51 and a second part frame 52, and these two separated parts are hinge-coupled through a pin 53. Each part frame is separately formed such that a wheel is installed thereon, respectively.

Figure 16:
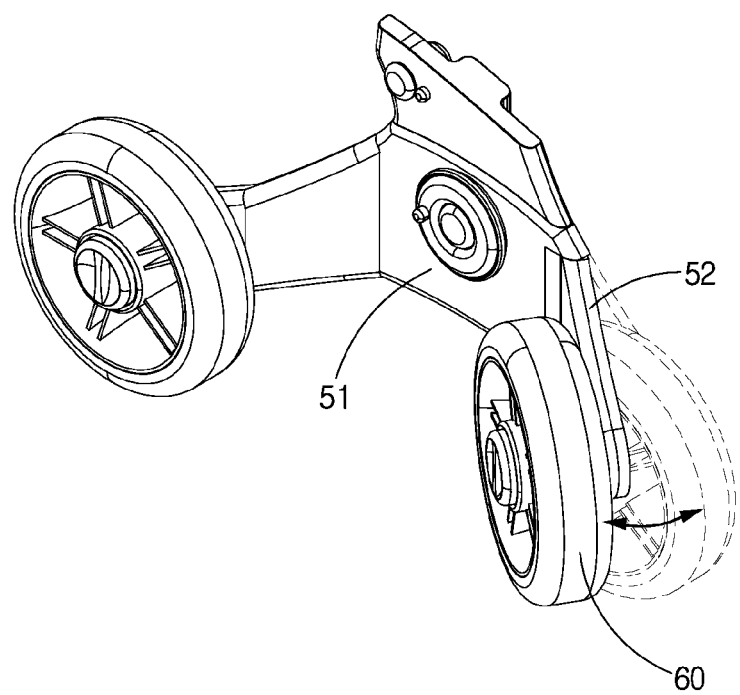
FIG. 16 is a functional state view of FIG. 15.

By doing this, as illustrated in FIG. 16, when moving by the wheel 60, it is possible to vary the proceeding direction of the wheel 60 in any direction, thereby securing ease of motion.

Figure 17:
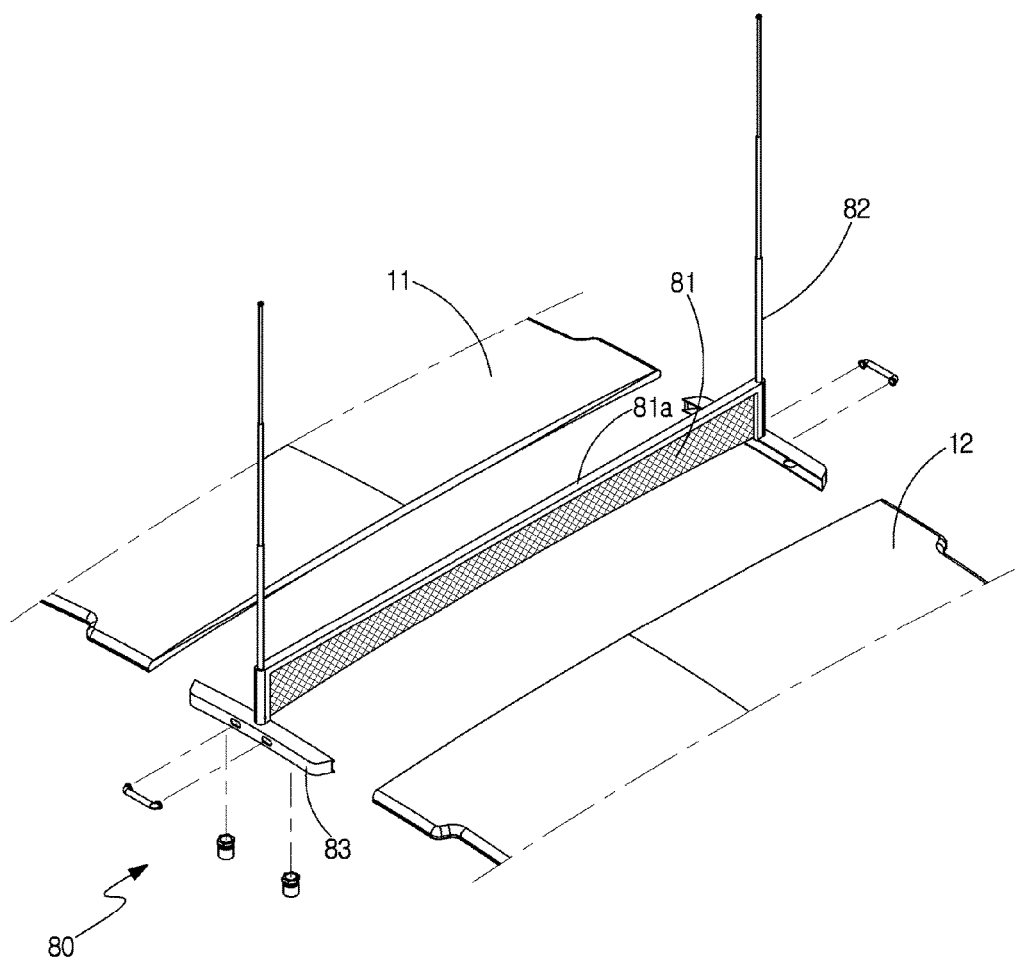
FIG. 17 is a view illustrating details of a net unit of FIG. 1.

FIG. 17 is a view illustrating details of a net unit of FIG. 1. Referring to FIG. 17, the net unit 80 includes a net 81, net pole 82, and coupling member 83.

The net is formed to have a length of 200 cm and a height of 35 cm 100 cm, and on the top end of the net 81, a fixing bar 81*a* is installed. Each end of the fixing bar 81*a* is coupled to the net pole 82.

The net pole 82 is coupled to the net 81 at both longitudinal ends of the net 81. Herein, the net pole 81 may be formed to have a shape of an antenna such that the height of the net 81 is adjustable.

There are one pair of coupling members 83 into which both sides of the first playing plane 11 and second playing plane 12 are inserted and coupled by a predetermined bolt, and net poles 82 are coupled on top of the coupling members 83.

Figure 18:
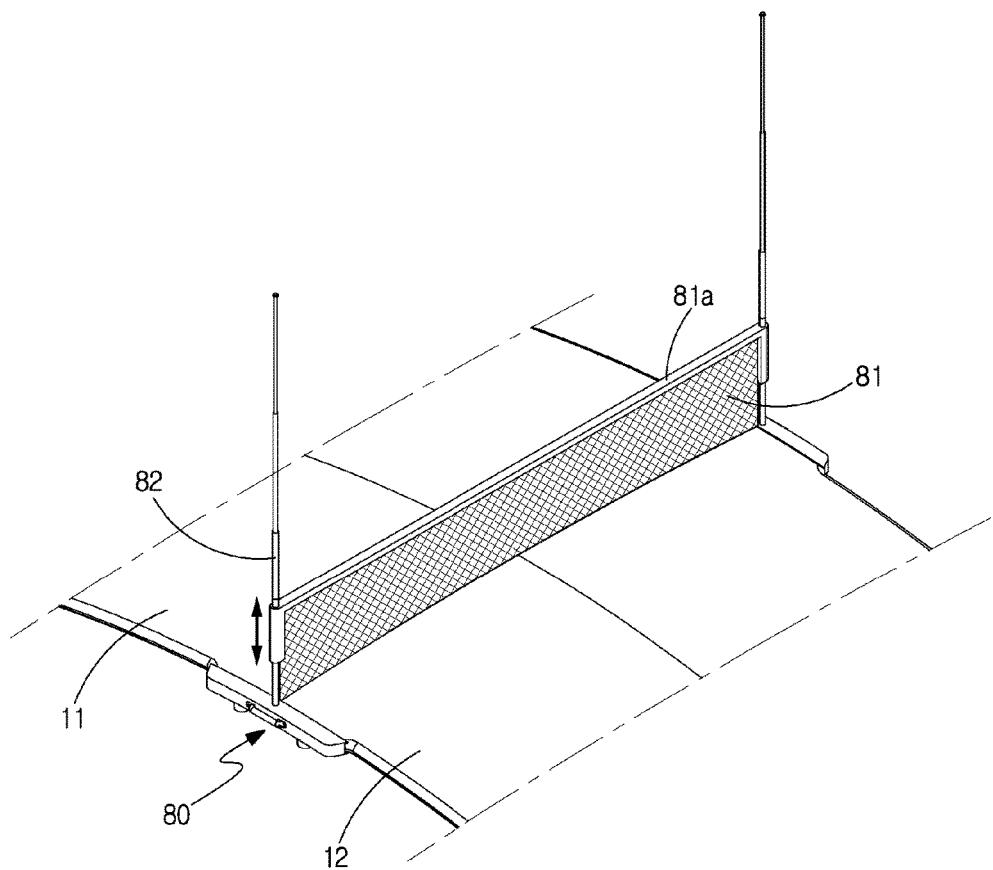
FIG. 18 is a view illustrating heights of the net of FIG. 17 being adjusted.

That is, as illustrated in FIG. 18, by moving the net poles 82 and fixing bar 81*a*, the height of the net 81 may be adjusted.

When using a multi-purpose exercise apparatus for improving sports coordination according to the aforementioned present disclosure, it is possible to improve the instant judgment ability and predictability suitable to momentary situations, and induce development of the perception ability and sensing ability based on immediate interaction between body parts according to instructions from the brain.

Furthermore, in the case of a football technique exercise, when sending a ball to a certain position intended by the user with a portion or an entirety of the table fixed vertically to form a wall, it is possible to perform an exact kick and a quick control on the rebounded ball, thereby acquiring the effect of improving the instant speed and the ability of converting the proceeding direction of the ball.

Furthermore, it is also possible to induce a situation to exercise the body adjustment ability of the highest difficulty level by forming a net with a vertical wall as in volleyball such that the ball may be moved only in the air, thereby bringing out the highest body adjustment ability to handle balls in the air of which the height and changes tend to be excessive.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

REFERENCE NUMERALS

1: MULTI-PURPOSE EXERCISE APPARATUS FOR IMPROVING SPORT COORDINATION
10: PLAYING PLANE
11: FIRST PLAYING PLANE
12: SECOND PLAYING PLANE
20: SUPPORT UNIT
21: FIRST SUPPORT
211: PLAYING PLANE FRAME
211A: FIRST FRAME
211B: SECOND FRAME
22: SECOND SUPPORT
30: PLAYING PLANE ANGLE ADJUSTMENT UNIT
31: ROTATION AXIS
32: ROTATION FRAME
32A: ROTATION GROOVE
32B: FIXING GROOVE
32C: STORING HOLE
33: FIXING PIN
33A: ELASTIC MEMBER
40: HEIGHT ADJUSTMENT UNIT
41: HANDLE
42: FIRST GEAR

43: SECOND GEAR
50: FIXING FRAME
51: FIRST PART FRAME
52: SECOND PART FRAME
53: PIN
60: WHEEL
70: LOCKING UNIT
71: LOCKING LEVER
72: FIRST LOCKING MEMBER
72A: INSERTION HOLE
73: SECOND LOCKING MEMBER
73A: PROTRUDING END
80: NET UNIT
81: NET
81A: FIXING BAR
82: NET POLE
83: COUPLING MEMBER

What is claimed is:

1. A multi-purpose exercise apparatus for improving sports coordination, the apparatus comprising:
 a first playing plane and a second playing plane each configured to have the square shaped panel and to meet each other at one side thereof, a central portion of an area where the playing planes meet each other formed as a curved surface upwardly convexed and downwardly inclined in an outer direction of a longitudinal direction and width direction; and
 a first support and a second support each disposed below and coupled to the first playing plane and the second playing plane, respectively, such that the playing planes are rotatable;
 wherein each support comprises a playing plane frame coupled along, an edge of each, playing plane, and a fixing frame coupled to the playing plane frame to support the playing plane frame from below;
 wherein the playing plane frame comprises a first frame coupled to each playing plane, and a second frame coupled below the first frame, and
 further comprising a playing plane angle adjustment unit disposed between the first frame and second frame, the first frame installed such that the first frame rotatable around the second frame.

2. The apparatus according to claim 1, wherein a first angle between a line extending from an uppermost part of each playing plane to a lowermost part of each playing plane in a longitudinal direction of each playing plane and a line extending from one lowermost part of each playing plane to the other lowermost part of each playing plane in a longitudinal direction of each playing plane is over 0 degree and less than 15 degree, and
 a second angle between a line extending from an uppermost part of each playing plane to a lowermost part of each playing plane in a width direction of each playing plane and a line extending from one lowermost part of each playing plane to the other lowermost part of each playing plane in a width direction of each playing plane is over 0 degree and less than 10 degree.

3. The apparatus according to claim 1,
 wherein a longitudinal end of each playing plane is formed to have an offset curvature.

4. The apparatus according to claim 1,
 wherein the playing plane angle adjustment unit comprises:
 a rotation frame of which one side is coupled and fixed to the first frame and the other side coupled to the second frame such that the other side of the rotation frame is rotatable;
 a rotation groove formed on the rotation frame; and
 a fixing pin installed on the first frame to move along the rotation groove,
 wherein the angle of the first frame is adjusted as the fixing pin moves along the rotation groove.

5. The apparatus according to claim 1,
 wherein the rotation frame is further provided with a storing hole where the fixing pin is inserted and fixed in response to the playing planes being arranged in a vertical direction.

6. The apparatus according to claim 1,
 wherein a movable wheel is installed in the fixing frame.

7. The apparatus according to claim 6,
 wherein a locking unit configured to prevent the wheel from rotating is installed in the fixing frame.

8. The apparatus according to claim 7,
 wherein the locking unit comprises:
 a locking lever configured to penetrate along the center of a rotation axis of the wheel from outside and to be screw-coupled to the fixing frame;
 a first locking member configured to rotate in an interlocked manner with the locking lever to move along an inner/outer direction of the wheel; and
 a second locking member installed on the fixing frame and geared to the first locking member to prevent the wheel from rotating.

9. The apparatus according to claim 1,
 further comprising a height adjustment unit disposed between the playing plane frame and fixing frame, and configured to enable adjustment of the height of the playing planes.

10. The apparatus according to claim 9,
 wherein the height adjustment unit comprises:
 a handle installed on the fixing frame such that the handle is rotatable, and coupled such that the handle may be withdrawn and inserted in an inner/outer direction;
 a first gear coupled in an inner direction of the handle, and configured to rotate in an interlocked manner with the handle; and
 a second gear coupled to the playing plane frame and geared to the first gear such that the second gear is movable in an up/down direction as the first gear rotates.

11. The apparatus according to claim 1,
 further comprising a net unit installed between the first playing plane and second playing plane.

* * * * *